United States Patent
Schilling et al.

(10) Patent No.: US 11,137,111 B1
(45) Date of Patent: Oct. 5, 2021

(54) HINGE POCKET ASSEMBLY FOR CONTAINMENT BERM

(71) Applicant: PacTec, Inc., Clinton, LA (US)

(72) Inventors: Michael Schilling, Clinton, LA (US); Mark Day, Clinton, LA (US); Troy Town, Clinton, LA (US); Derrel Thomas, Clinton, LA (US)

(73) Assignee: PacTec, Inc., Clinton, LA (US)

( * ) Notice: Subject to any disclaimer, the term of this patent is extended or adjusted under 35 U.S.C. 154(b) by 312 days.

(21) Appl. No.: 16/102,295

(22) Filed: Aug. 13, 2018

(51) Int. Cl.
*B65D 90/24* (2006.01)
*F16N 31/00* (2006.01)

(52) U.S. Cl.
CPC .......... *F16N 31/006* (2013.01); *B65D 90/24* (2013.01)

(58) Field of Classification Search
CPC .............................. B65D 90/24; F16N 31/006
USPC ........................................................ 220/573
See application file for complete search history.

(56) References Cited

U.S. PATENT DOCUMENTS

| | | | | |
|---|---|---|---|---|
| 2,912,137 | A * | 11/1959 | Taylor | B65D 90/046 220/23.87 |
| 5,316,175 | A * | 5/1994 | Van Romer | F16N 31/006 220/4.12 |
| 5,762,233 | A * | 6/1998 | Van Romer | F16N 31/006 220/573 |
| 8,562,251 | B2 | 10/2013 | Beak et al. | |
| 9,091,032 | B2 * | 7/2015 | Laing | F16N 31/006 |
| 9,181,026 | B2 | 11/2015 | Laing et al. | |
| 9,869,427 | B2 | 1/2018 | McAtarian et al. | |
| 2004/0169041 | A1 * | 9/2004 | Van Romer | F16N 31/006 220/573 |
| 2007/0127852 | A1 | 6/2007 | Town et al. | |
| 2010/0146734 | A1 * | 6/2010 | Munson | E05D 5/121 16/334 |
| 2011/0174713 | A1 | 7/2011 | Ramp et al. | |
| 2011/0174813 | A1 * | 7/2011 | Ramp | F16N 31/006 220/9.4 |
| 2012/0193369 | A1 | 8/2012 | Beak et al. | |
| 2014/0246441 | A1 | 9/2014 | Starr et al. | |
| 2015/0096980 | A1 * | 4/2015 | Laing | B65D 90/24 220/9.4 |
| 2015/0184351 | A1 * | 7/2015 | Laing | F16N 31/006 405/52 |
| 2016/0185523 | A1 * | 6/2016 | Starr | B64F 5/30 220/7 |

(Continued)

OTHER PUBLICATIONS

U.S. Appl. No. 15/680,398 (Self-Supporting Waste Disposal Enclosure)—Examiner's Action dated Feb. 7, 2019.

*Primary Examiner* — J. Gregory Pickett
*Assistant Examiner* — Niki M Eloshway
(74) *Attorney, Agent, or Firm* — Jones Walker LLP

(57) ABSTRACT

A containment berm formed of a flexible, substantially impermeable polymer material defining a ground section with a plurality of sidewalls extending upward from the ground section. A plurality of hinges are positioned on an interior of the containment berm, with the hinges having first and second aims rotating on a pin, the first arm engaging a first sleeve on one of either the ground section or a sidewall, and the second arm engaging a second sleeve on the other of the ground section or the sidewall. The second sleeve is configured to allow the hinge to slide far enough away from the first sleeve to allow the first arm to disengage from the first sleeve.

19 Claims, 4 Drawing Sheets

(56) References Cited

U.S. PATENT DOCUMENTS

2016/0281924 A1* 9/2016 Beak ................ F16M 11/10
2017/0144835 A1   5/2017 Butler et al.

* cited by examiner

HINGE POCKET ASSEMBLY FOR CONTAINMENT BERM

I. BACKGROUND

Figure 1:
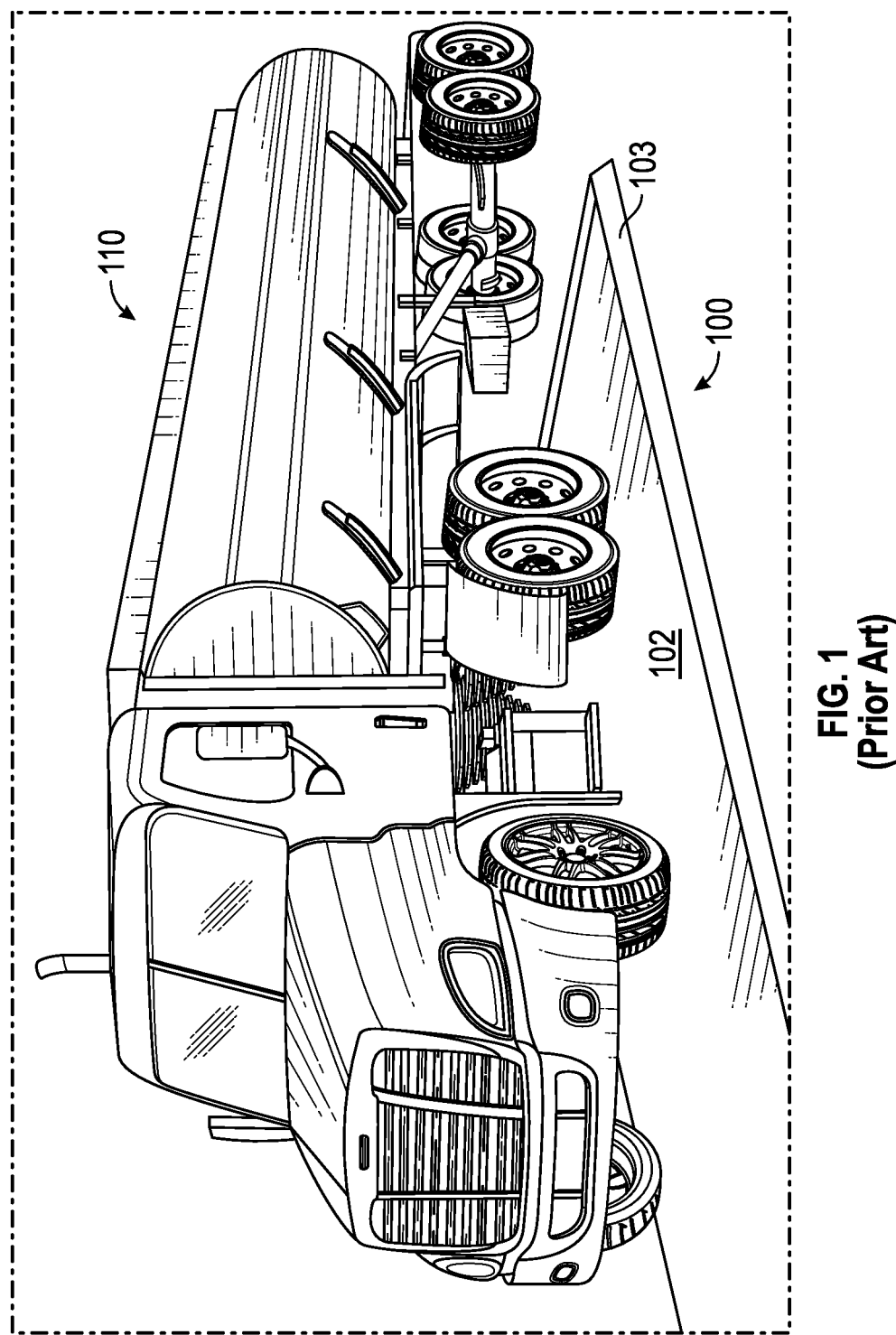

This instant disclosure is directed to a flexible, portable containment apparatus for capturing liquid pollutants such as petrochemicals and the like. Environmental ground contamination is often the long term result of repeated spills of such materials during the transfer from one container to the other at a particular site, for example where vehicles are fueled and serviced. Flexible, portable structures for capturing pollutants or contaminants, often called "containment berms" are well known in the art. FIG. 1 illustrates a containment berm 100 having a ground section 101 and sidewalls 103. Whether the berm is rectangular, round, or otherwise, sidewalls normally enclose berm 100 to prevent the escape of liquids. In FIG. 1, the sidewalls 103 are shown in a substantially lowered or collapsed state. The vehicle 110 will drive over the sidewalls 103 and once the vehicle is fully over ground section 101, the sidewalls 103 may be raised. Although not specifically shown in FIG. 1, it is also well known to position brace members against the sidewalls to maintain sidewalls 3 in a raised position to retain spilled liquids within the containment berm.

However, these braces are often time consuming to place and remove as the vehicle drives on and off the containment berm. Similarly, when the braces are not permanently attached to the berm material, the braces easily become misplaced and are not available when needed. When the braces are attached to the berm material, the braces are often a hindrance to compactly folding the containment berm for storage. Additionally, when the permanently attached braces become damaged, it is often necessary to replace the entire containment berm as opposed to merely the damaged brace(s). A containment berm overcoming these disadvantages in the prior art would be a significant improvement.

II. SUMMARY OF SELECTED EMBODIMENTS

One embodiment of the invention is a containment berm formed of a flexible, substantially impermeable polymer material defining a ground section with a plurality of sidewalls extending upward from the ground section. A plurality of hinges are positioned on an interior of the containment berm, with the hinges having first and second arms rotating on a pin, the first arm engaging a first sleeve on one of either the ground section or a sidewall, and the second arm engaging a second sleeve on the other of the ground section or the sidewall. The second sleeve is configured to allow the hinge to slide far enough away from the first sleeve to allow the first arm to disengage from the first sleeve.

Another embodiment is a method of protecting a maintenance site from vehicle contaminant spills using the above described containment berm. The method includes the steps of (a) providing the above containment berm in a rolled or folded state; (b) unrolling or unfolding the containment berm at the maintenance site; (c) with at least one sidewall collapsed by substantially closing or leaving substantially closed the hinges associated with the sidewall, driving a vehicle onto the containment berm; and (d) raising the at least one collapsed sidewall by opening the hinges from the substantially closed position.

III. BRIEF DESCRIPTION OF DRAWINGS

Figure 2:
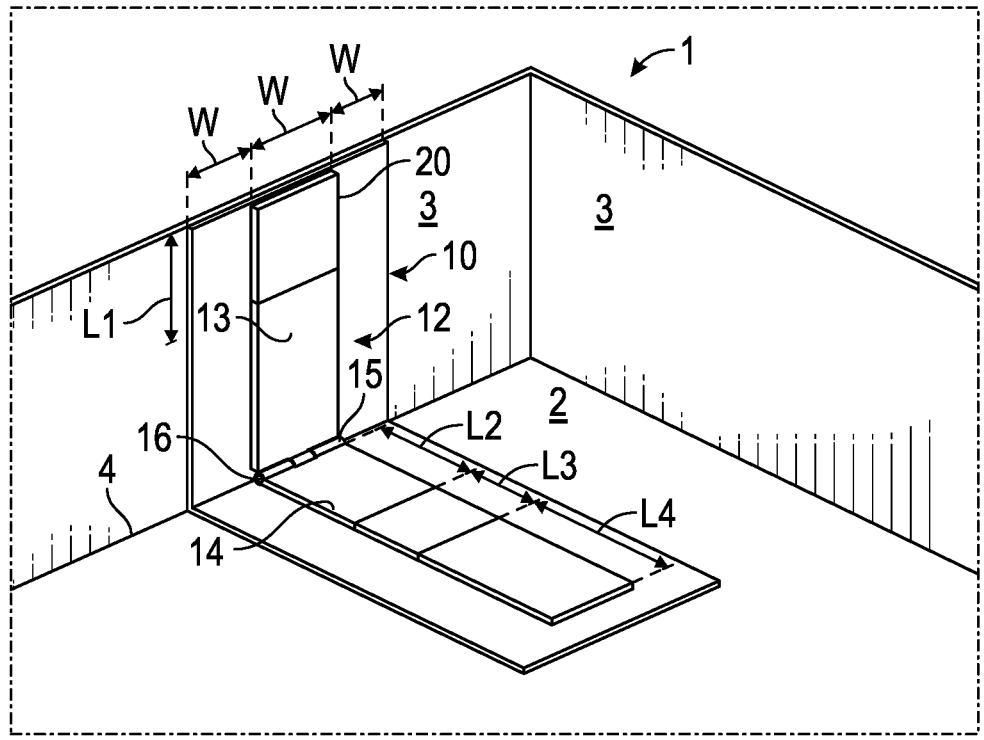
Figure 3A:
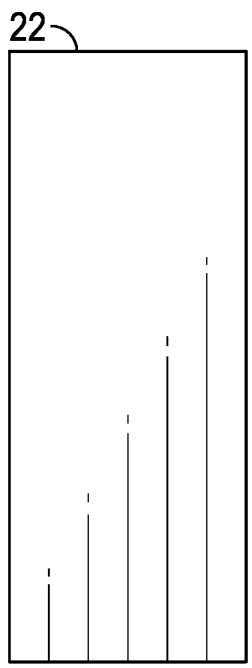
Figure 3B:
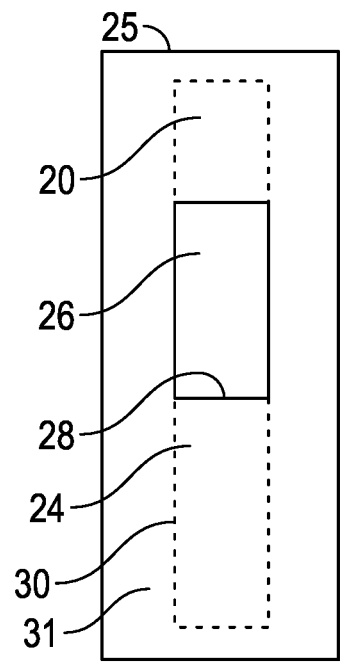
Figure 3C:
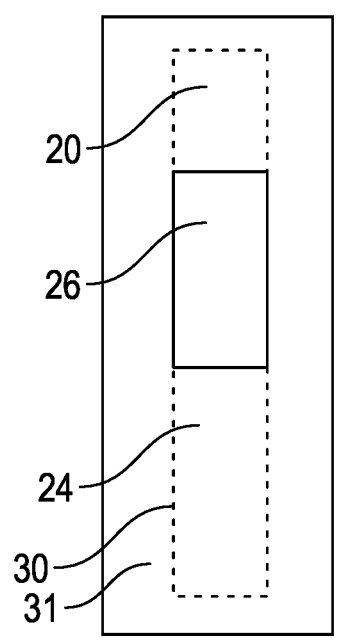
Figure 4:
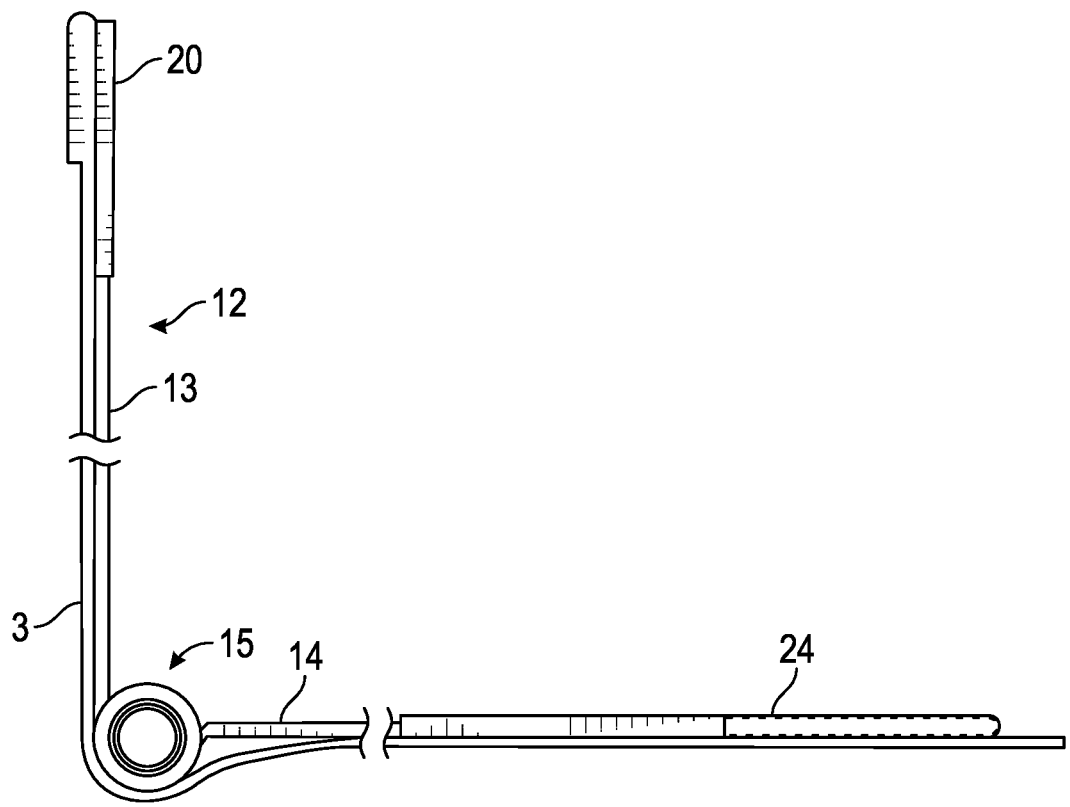
Figure 5A:
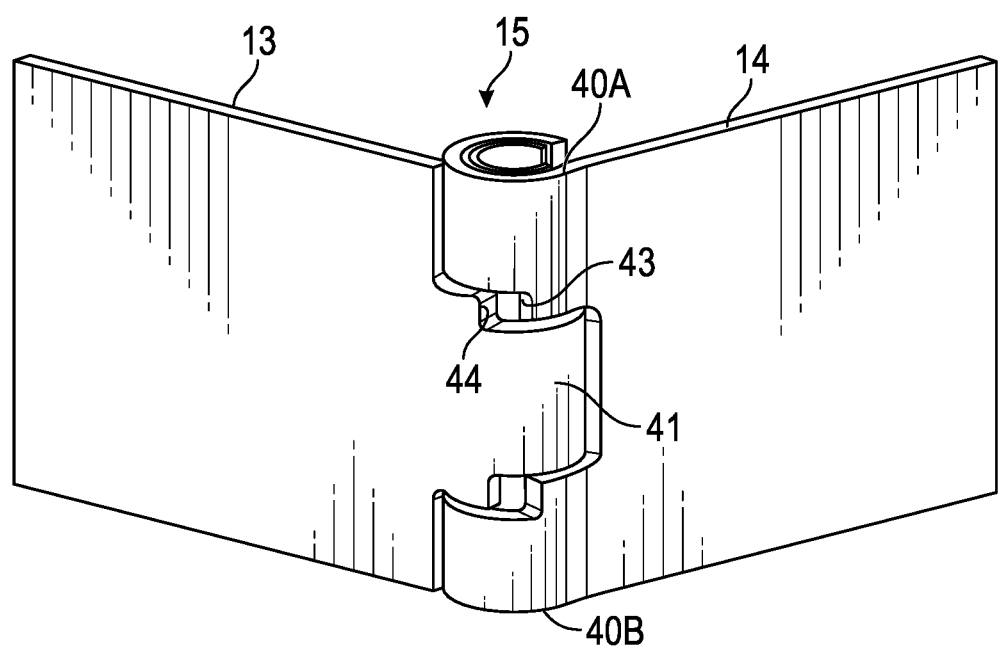
Figure 5B:
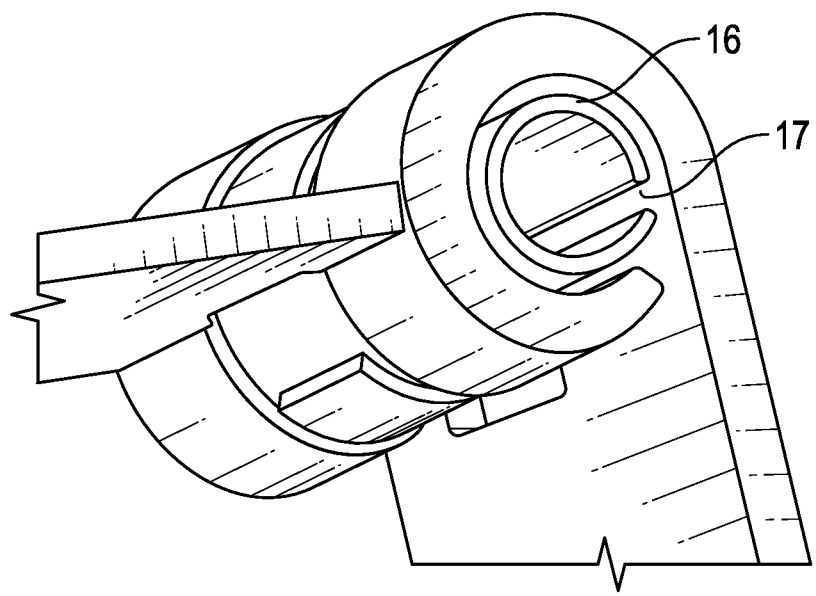
Figure 6:
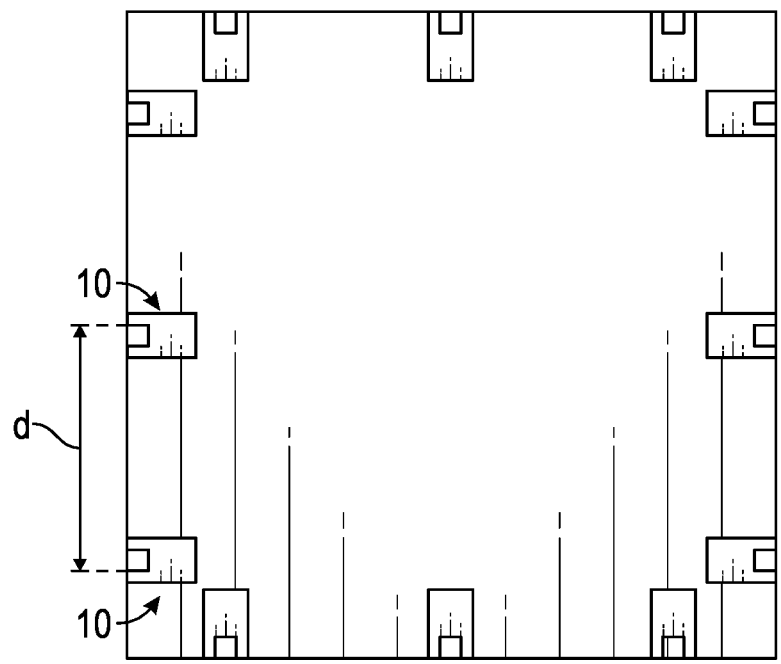

FIG. 1 illustrates a prior art containment berm.
FIG. 2 is a perspective view of one embodiment of the hinge pocket or bracket assembly of the present invention.
FIGS. 3A to 3C illustrate one embodiment of the material layers forming the hinge pockets.
FIG. 4 is a side view of the FIG. 2 hinge pocket assembly.
FIGS. 5A and 5B illustrate details of the hinge used in the FIG. 2 embodiment.
FIG. 6 is a top view showing placement of the hinge pocket assemblies in a containment berm.

IV. DETAILED DESCRIPTION OF SELECTED EMBODIMENTS

FIG. 2 shows a section of a containment berm 1 generally formed of the ground section 2, the sidewalls 3, and the hinge pocket assembly (or sometimes "hinge bracket assembly") 10 positioned between the ground section 2 and a sidewall 3 on the interior surface of the containment berm 1. The knuckles of the hinge are shown against the berm lower corner 4 formed at the line where ground section 2 and sidewalls 3 join. Hinge pocket assembly 10 most generally will include a hinge 12 whose arms are held in contact with sidewall 3 by the pocket or sleeve 20 and in contact with ground section 2 by pocket or sleeve 24. Hinge 12 includes a first arm or leaf 13 and a second arm or leaf 14 with each arm having knuckles 15 which are held together in rotative relation by the hinge pin 16. Hinge arms 13 and 14 will normally have a length slightly shorter than the height of the berm sidewall 3. Typical heights for berm sidewalls 3 range between 6" and 18". As suggested in FIG. 1, containment berms are often rectangular, but could be circular or any other shape. The size of the containment berms can vary greatly, for example as small as 3'×3' to greater than 50'×100' (including any size area and configuration in between).

In the illustrated embodiment, the pockets 20 and 24 are formed of two layers or panels of material bonded, sewn, or otherwise fixed to the ground section and sidewalls of the containment berm. The panels may be formed of many different materials having the required strength, but often will be constructed of the same material as the berm itself, e.g., polyvinyl chloride, polyethylene, urethane or a blend of various polymers to provide specific chemical resistance or structural characteristics. The panels' thicknesses may vary based on the mechanical characteristics desired, but will generally range between 15 and 60 mils. FIG. 3A shows the base panel 22 while FIG. 3B shows the pocket or sleeve panel 25. The pocket panel 25 will generally be similar to base panel 22, but include an open section 26 of removed material in the center of the panel. FIG. 3C suggests how pocket panel 25 will be positioned over and secured to base panel 22. The panel may be secured together by any conventional (or future developed) technique, including gluing, chemical bonding, extrusion welding, heat sealing, or simply sewing the two panels together. However, not all of the pocket panel 25 will be fixed to base panel 22. The two panels will be joined in the peripheral areas 31 up to the boarder 30, but not inside the boarder 30, thereby creating the pockets 20 and 24. As shown in FIG. 2, the combined base panel 22 and pocket panel 25 will then be secured to both the sidewall 3 and ground section 2, such that pocket 20 is positioned on the sidewall and pocket 24 on the ground section.

FIG. 2 likewise suggests how in the illustrated embodiment, the pockets 20 and 24 will have a width "w" approximating the width of hinge arms 13, 14, with the peripheral areas 31 on each side of the pockets also having a width "w." Of course in other embodiments, the peripheral areas 31 on each side of the pockets could be wider or narrower than the pocket width. The pocket 20 seen in FIG. 2 has a length L1 into which hinge arm 13 may slide. Often this length L1 is between 20% and 50% the length of hinge arm 13. On the other hand, pocket 24 is shown having a length greater than L1. When hinge arm 13 fully engages pocket 20, hinge arm 14 will engage the L3 portion of pocket 24, which may be similar in length to L1. However, pocket 24 has the additional length L4, which assists in insertion and removal of the hinge arms from the pocket. For example, to remove hinge 12 from the pockets, hinge arm 14 is pushed down into the L4 portion of pocket 24. The flexible nature of berm material allows the berm lower corner 4 to move forward while sidewall 3 bends backwards, thereby allowing hinge arm 13 to slip out of pocket 20. To insert a hinge 12 into the pockets, hinge arm 14 is again pushed into the L4 portion of pocket 24 and then hinge arm 13 may be worked into pocket 20.

In some embodiments, the length L1 may be considered an "insertion length" into pocket 20 and the lead edge 28 of pocket 24 is positioned sufficiently far from hinge knuckles 15 (when in berm lower corner 4) that hinge arm 14 can move toward lead edge 28 at least 50% to 150% of the insertion length L1, and more preferably, toward the lead edge 28 at least 75% of the insertion length. Thus, viewing FIG. 2, it will be apparent how hinge arm 13 engages pocket 20 and how pocket 24 has a length (i.e., L3+L4) sufficient for the hinge knuckle 15 to slide far enough away from the pocket 20 to allow hinge arm 13 to disengage from pocket 20. The "pockets" 20 and 24 illustrated in the figures are "closed" pockets, i.e., two sides and the distal end of the pockets (i.e., distal from the hinge arms) are adhered to panel 22. However, alternate embodiments could employ "open" pockets or sleeves where both ends are open and only the sides are closed. For example, one alternative embodiment could form pocket 24 as an open pocket having a length of only about L3. Likewise, while FIG. 2 shows the longer pocket located on ground section 2, other embodiments could locate the longer pocket on sidewall 3.

FIGS. 4 to 5B describe in more detail one embodiment of hinge 12. As best seen in FIG. 5A, the hinge knuckles 15 include outer hinge knuckle sections 40A and 40B formed on hinge arm 14 and inner hinge knuckle section 41 formed on hinge arm 13. The hinge knuckle sections 40 and 41 are secured together with the hinge pin 16, which in this embodiment (see FIG. 5B) is a roll pin (a/k/a a slotted pin or slotted spring pin) having the slot 17 formed therein. The slotted spring pin is compressed when inserted and exerts force on the inner surface of the knuckles, thereby providing resistance to the rotation of hinge arms 13 and 14 toward and away from each other around pin 16. In one embodiment, the force of slotted spring pin 16 results in hinge 12 requiring between about 20 and about 60 in-lbs of moment or torque to move the hinge arms relative to one another. In other embodiments, the slotted spring pin results in hinge 12 requiring a torque anywhere between 5 and 150 in-lbs (or any subrange in between). In general, the torque resistance of the hinge should be in a range that (i) allows an individual to, by hand, open and close the hinges, and (ii) allows the hinges, in the open position (i.e., with sidewalls vertical), to resist wind loads or other loads anticipated to act on the sidewalls.

FIG. 5B also shows knuckle sections 40A and 40B with stop shoulders 43 and knuckle section 41 with stop shoulders 44. It will be readily understood how the engagement of stop shoulders 43 and 44 limit the range through which hinge arms 13 and 14 can swing apart. In many embodiments, the stop shoulders fix hinge 12 from opening more than 120° from a closed position, and more preferably limits hinge 12 from opening more than approximately 90° from the closed position. In other words, the hinges can fold inward such that the sidewalls move inward toward the ground section of the berm, but the hinges cannot fold outward further than the sidewalls being at the vertical.

FIG. 6 illustrates the spacing distance "d" between hinge assemblies 10 along the sidewalls of containment berm 1. In many embodiments, the distance d will be between about 12" and about 48", with more preferred embodiments having a distance d between about 24" and about 36". Nevertheless, there could be embodiments having a spacing distance d outside of these ranges.

Those skilled in the art will see certain advantages arising from the above described embodiments. For example, the resistance of the hinges to torque arising from the slotted spring pin means that users can quickly fold an end sidewall of the berm down (i.e., push by hand the arms of the hinges together) in order for a vehicle to drive onto the berm, and then open the hinge by hand to raise that end sidewall. Similarly, for storage and transport of the containment berm, the sidewalls are folded inward on the hinges and the entire containment berm folded or rolled into a size easily handled by a single person. Thus, all the hardware needed to fully deploy the berm (i.e., the hinges) are inherently stored and transported with the berm itself. These same features will naturally speed up deployment of the berm on site. Finally, if a hinge is damaged or the torque resistance becomes too low, the hinge can be easily replaced by the techniques described above and the containment berm continued in use.

The term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc.

The invention claimed is:

1. A containment berm comprising:
   (a) a flexible substantially impermeable polymer material forming a ground section with an enclosing sidewall extending upward from the ground section;
   (b) a plurality of hinges positioned on an interior of the containment berm, the hinges formed of first and second arms rotating on a pin, the first arm engaging a first pocket on one of either the ground section or a sidewall, and the second arm engaging a second pocket on the other of the ground section or the sidewall;
   (c) wherein the second pocket is configured to allow the hinge to slide far enough away from the first pocket to allow the first arm to disengage from the first pocket;
   (d) wherein friction between the pin and arms of each hinge resists a torque on the hinge of between about 10 in-lbs. and about 150 in-lbs;
   (e) wherein the hinge is fixed against opening more than 120° from a closed position and oriented to allow the sidewall to move inward against the ground section when the hinge is in the closed position, and
   (f) wherein the first pocket and second pocket are (i) closed pockets, and (ii) configured to allow withdrawal of both hinge arms and separation of the hinge from the containment berm while the pin engages the hinge arms.

2. The containment berm of claim 1, wherein the hinges are positioned against a lower berm corner formed where the berm sidewall and ground section join.

3. The containment berm of claim 1, wherein the pockets are formed between two panels of additional material secured to the impermeable material.

4. The containment berm of claim 1, wherein the hinge includes knuckles and stops which fix the hinge against opening more than 120° from a closed position.

5. The containment berm of claim 1, wherein the hinge pin is a slotted spring pin.

6. The containment berm of claim 1, wherein (i) a first arm of each hinge has a length and at least partially engages a first pocket; (ii) a second arm of each hinge has a length and at least partially engages a second pocket; and (iii) the second pocket is positioned such that the hinge is capable of sliding far enough away from the first pocket to allow the first arm to disengage from the first pocket.

7. The containment berm of claim 6, wherein the first arm has an insertion length into the first pocket and a lead edge of the second pocket is positioned to allow the second arm to move toward the lead edge between about 50% and about 150% of the insertion length.

8. The containment berm of claim 7, wherein the lead edge of the second pocket is positioned to allow the second arm to move toward the lead edge at least 75% of the insertion length.

9. A method of protecting a maintenance site from vehicle contaminant spills, the method comprising the steps of:
 (a) providing a containment berm in a rolled or folded state, the containment berm comprising:
  (i) a flexible substantially impermeable polymer material forming a ground section with an enclosing sidewall extending upward from the ground section;
  (ii) a plurality of hinges positioned on an interior of the containment berm, the hinges formed of first and second arms rotating on a pin, the first arm engaging a first pocket on one of either the ground section or a sidewall, and the second arm engaging a second pocket on the other of the ground section or the sidewall;
  (iii) wherein (1) the first and second pockets are closed pockets, and (2) the second pocket is configured to allow the hinge to slide far enough away from the first pocket to allow the first arm to disengage from the first pocket;
  (iv) wherein the hinges are positioned against a lower berm corner formed where the berm sidewall and ground section join;
  (v) wherein friction between the pin and arms of each hinge resists a torque on the hinge of between about 10 in-lbs. and about 150 in-lbs; and
  (vi) wherein the hinges are fixed against opening more than 120° from a closed position;
 (b) unrolling or unfolding the containment berm at the maintenance site;
 (c) with at least one sidewall collapsed by substantially closing or leaving substantially closed the hinges associated with the sidewall, driving a vehicle onto the containment berm; and
 (d) raising the at least one collapsed sidewall by opening the hinges from the substantially closed position.

10. The method of claim 9, further comprising the steps of replacing at least one hinge by the steps of (i) sliding a damaged hinge into the second pocket far enough to remove the first arm from the first pocket; (ii) sliding the second arm of the damaged hinge from the second pocket; and (iii) positioning a functioning hinge into the first and second pockets.

11. The containment berm of claim 9, wherein the first pocket and second pocket are configured to allow withdrawal of both hinge arms and separation of the hinge from the containment berm while the pin engages the hinge arms.

12. The containment berm of claim 9, wherein the second pocket is sufficiently long that the hinge can move into the second pocket to remove the first arm from the first pocket.

13. The containment berm of claim 9, wherein the pockets are formed between two panels of additional material secured to the impermeable material.

14. The containment berm of claim 9, wherein the second pocket is positioned on the ground section of the containment berm.

15. The containment berm of claim 9, wherein the hinge pin is a slotted spring pin.

16. The containment berm of claim 9, wherein (i) a first arm of each hinge has a first length and at least partially engages a first pocket; (ii) a second arm of each hinge has a second length and at least partially engages a second pocket; and (iii) the second pocket has a length sufficient for the hinge to slide far enough away from the first pocket to allow the first arm to disengage from the first pocket.

17. The containment berm of claim 16, wherein the first arm has an insertion length into the first pocket and a lead edge of the second pocket is positioned to allow the second arm to move toward the lead edge between about 50% and about 150% of the insertion length.

18. The containment berm of claim 17, wherein the lead edge of the second pocket is positioned to allow the second arm to move toward the lead edge at least 75% of the insertion length.

19. A containment berm comprising:
 (a) a flexible substantially impermeable polymer material forming a ground section with an enclosing sidewall extending upward from the ground section;
 (b) a plurality of hinges positioned on an interior of the containment berm, the hinges formed of first and second arms rotating on a pin, the first arm engaging a first pocket on one of either the ground section or a sidewall, and the second arm engaging a second pocket on the other of the ground section or the sidewall;
 (c) wherein (1) the first and second pockets are closed pockets, and (2) the second pocket is configured to allow the hinges to slide far enough away from the first pocket to allow the first arm to disengage from the first pocket, thereby allowing removal of the hinges from the pockets without removing the pin from engagement with the first and second arms;
 (d) wherein friction between the pin and arms of each hinge resists a torque on the hinge of between about 10 in-lbs. and about 150 in-lbs; and
 (e) wherein the hinges are fixed against opening more than 120° from a closed position and oriented to allow the sidewall to move inward against the ground section when the hinges are in the closed position.

\* \* \* \* \*